(12) United States Patent
Monjes

(10) Patent No.: US 6,324,862 B1
(45) Date of Patent: Dec. 4, 2001

(54) AIR COOLER BY ENHANCED EVAPORATION AND HEATER

(76) Inventor: Julio A. Monjes, 6400 N. Montrose Dr., Tucson, AZ (US) 85741

( * ) Notice: Subject to any disclaimer, the term of this patent is extended or adjusted under 35 U.S.C. 154(b) by 0 days.

(21) Appl. No.: 09/494,668

(22) Filed: Jan. 31, 2000

(51) Int. Cl.[7] .................................................. F25D 17/04
(52) U.S. Cl. .............................. 62/309; 62/310; 62/311; 62/305; 62/324.2
(58) Field of Search ................................. 62/305, 324.2, 62/309, 310, 311

(56) References Cited

U.S. PATENT DOCUMENTS

| | | | |
|---|---|---|---|
| 3,913,345 | * 10/1975 | Goettl | 62/183 |
| 4,918,943 | * 4/1990 | Faust | 62/305 |
| 5,046,331 | * 9/1991 | O'Neal et al. | 62/304 |
| 5,921,101 | * 7/1999 | Wang | 62/305 |
| 5,946,932 | * 9/1999 | Wang | 62/305 |
| 5,992,171 | * 11/1999 | Bacchus | 62/305 |
| 6,047,555 | * 4/2000 | Weng | 62/171 |
| 6,070,423 | * 6/2000 | Hebert | 62/277 |

* cited by examiner

Primary Examiner—William Doerrler
Assistant Examiner—Mark Shulman

(57) ABSTRACT

This novel device is an enhanced evaporative cooler, which can be transformed into a heater. It is embodied in a single unit with two operational modes. In the A or cooling mode it is comprised of two cooling stages, the first stage consists of an air blower and a plurality of evaporation channels, and a cold water collection tray placed under the said channels, the evaporation channels have nozzles injecting high pressure water, producing a very fine spray, part of the spray evaporates, the rest is cooled and collected in the cool water tray, this cool water is pump circulated through the second stage. The second stage consists of an air to water heat exchanger, an air blower and a warm water collection tray where the output from the heat exchanger is collected, the water in the warm water tray is pumped back to the nozzles starting a new cycle. In the B or heater mode a heater element located in the second stage warm water tray is activated, the so heated water circulates only within the second stage.

9 Claims, 4 Drawing Sheets

US 6,324,862 B1

AIR COOLER BY ENHANCED EVAPORATION AND HEATER

BACKGROUND OF THE INVENTION

This novel device in operational mode A is a two stage enhanced evaporative cooler which can be transformed into a heater by changing to operational mode B. It can be used in open or closed loop configuration for controlling the temperature of one or more ambients.

Evaporative coolers in use today, achieve a temperature reduction of the circulating air by a water surface evaporation process, this is an isoenthalpic process where the air temperature is lowered by heat transfer to the evaporating water. Consequently the air's moisture is increased up to the dew point. Such final state may not be comfortable when the initial air temperature and relative moisture are only a few degrees from dew point. This characteristic limits the application of this type of cooling to very dry weather conditions.

Various systems have been patented to solve such shortcomings: U.S. Pat. No. 5,050,391 refers to a double sided heat exchanger having a dry surface along which the air flows. The opposite side is cooled by water evaporation. This general method of cooling one surface of one element by water evaporation while cooling the usable air with the dry opposite side of the same element or another element thermally connected are the basis for U.S. Pat. Nos. 4,002,040 and 5,453,223

U.S. Pat Nos. 4,171,620; 4,786,301; 4,864,830; 4,982,575 and 5,460,004 all in different ways make use of desiccants to reduce the relative humidity of the cooled air.

In the present invention no desiccants are required and the porous element and or double sided opposite surfaces elements are substituted by an array or plurality of finned evaporation channels plus a second stage which is a conventional air to water heat exchanger. This combination produces a cool, dry air which is desirable for comfort.

On application P19980103167 "Acondicionador de Aire Por Evaporacion y Calefactor," of this same author at the Patent Office in Buenos Aires, Argentina, the water drained from the first stage, evaporation tubes, is mixed with the water drained from the second stage, heat exchanger, in a common single tray and pumped by a single pump to both stages. This method resulted inefficient by requiring a long time to lower the water temperature in the single tray to the best operational value.

In the present invention such inconvenience is overcome by the use of two separate water trays, one for cold water, one for warm water, each one with an independent pump, such that in the cooler mode the warm water drained from the heat exchanger is directly pumped to the evaporation channels where it is cooled then pumped to the heat exchanger where it will absorb the heat from the air and will be drained to the warm water tray, in a continuous cycle.

By having a separate tray and pump for the cold water, a lower operating temperature is achieved in a shorter time. This arrangement, allows for the use of more than one heat exchanger which can be in a remote location.

Basically this novel system works with a fundamentally different thermal cycle than the one in previous patents. An additional difference is that the fins of the evaporation channels provides for a pre-cooling of the air in its way to the second stage. Also the method of indirect spraying by impacting of a high pressure water jet to produce a very fine spray, allows for larger diameter nozzles, avoiding the clogging so frequent in systems with direct spraying requiring very small diameter ejection holes.

BRIEF SUMMARY OF THE INVENTION AND DRAWINGS

This invention is comprised by a first stage or water evaporation stage and, a second stage or air to water heat transfer stage. The first stage main components are; a first air blower, a plurality of open vertical channels with water injection nozzles, a cold water collection tray, and a first or cold water pump. The evaporation in the first stage produces cold water which is drained into the cold water tray, from here it is pumped to the second stage, which is comprised of a conventional air to water heat exchanger, a warm water collection tray, a second water pump and a second air blower, which reinforces the air flow through the heat exchanger. The warm water drained from the heat exchanger into the warm water tray is then pumped by the second pump to the nozzles inside the channels, where it is pulverized by impact and cooled by evaporation in the up draft air current in the channels, in a continuous cycle where, heat is extracted from the air in the exchanger and evacuated in the channels by the evaporated water. In this manner the unit output air will have a lower temperature and lower moisture than the air input to the unit. The unit can operate in closed or open loop air circulation mode, it also can provide water to the external heat exchangers.

In the heating operational mode the first stage water jets are inoperative, however, the air continues to circulate through the two stages. A heating element located in the warm water tray is activated. By this means the second stage heat exchanger receiving heated water transfers such heat to the circulating air. The heating element is inoperative when the system works as a cooler.

The main components of the invention for both operational modes are depicted in the following figures.

DETAILED DESCRIPTION OF THE INVENTION AND DRAWINGS

Figure 1:
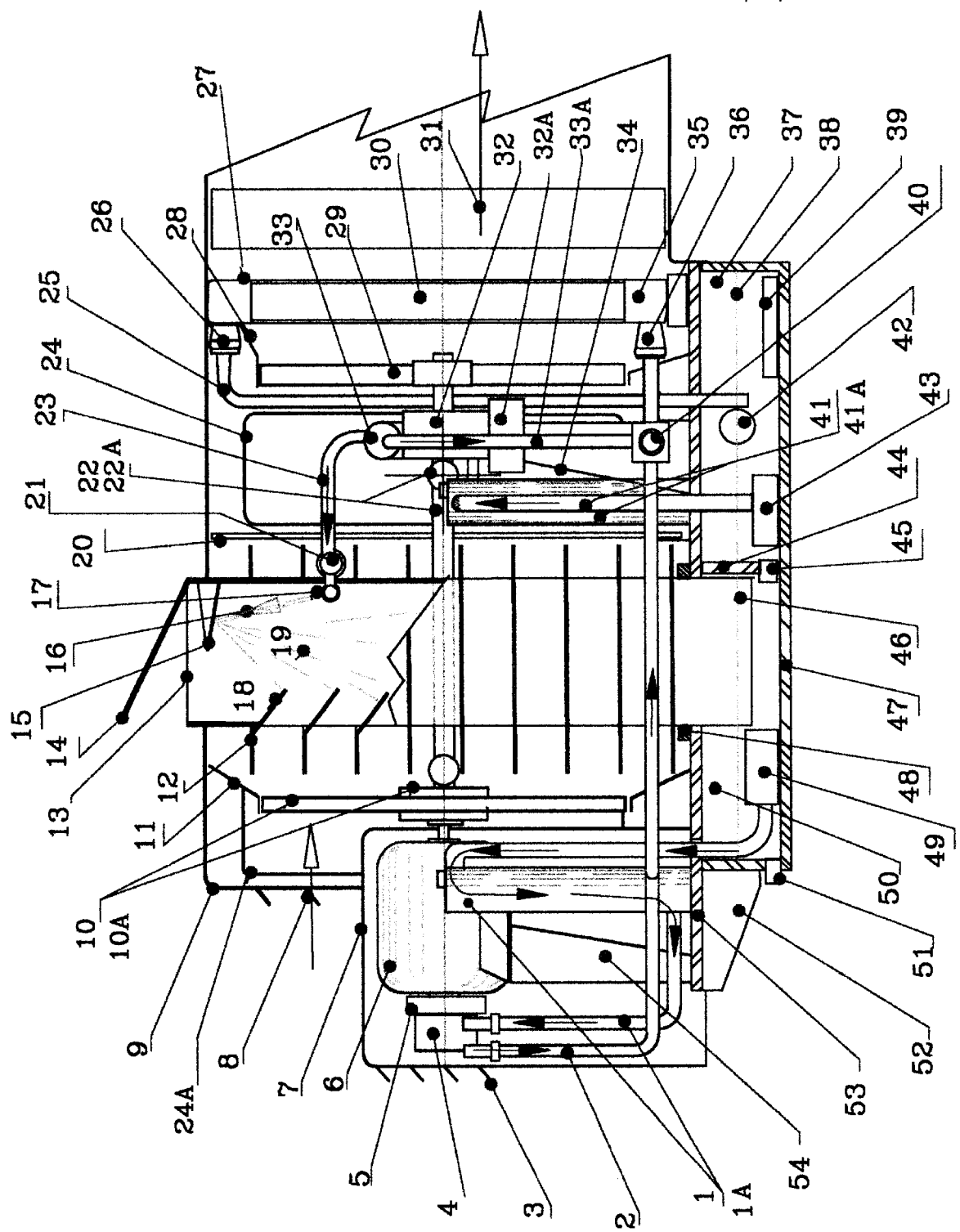
FIG. 1 is a longitudinal cross section showing the components of the main system.

The nomenclature used for the detailed functioning will follow the number sequence of FIG. 1, FIG. 1A, FIG. 2, FIG. 2A, FIG. 2B, and FIG. 2C. FIG. 1 is a longitudinal cross section of this "Air Cooler by Enhanced Evaporation and Heater." this figure shows all the components installed in an enclosure compatible with fixed commercial or domestic usage. In both modes, as a cooler or as a heater, the system can work in open or closed loop by properly setting the recirculation flaps and external air intake louvers aperture.

Item 1 and 1A are the water suction line and the siphon system from the first or cold water tray to pump 4, this siphon, by preventing back flow, ensures permanent priming of the pump, the forward water flow direction is indicated by arrows.

Item 2, is the low pressure cold water line from pump 4, to the heat exchanger 30.

Item 3, are the ventilation louvers for cooling the electric motor 6.

Item 4, is the first or cold water pump.

Item 5, is the clutch which disconnects the pump 4 when the system operates as a heater.

Item 6, is the double output shaft electric motor driving, from one end, the first air blower and through shaft extension 22 the second blower 29 and pump 32, from the opposite end drives the pump 4.

Item 7, is the enclosure of motor 6.

Item 8, is the variable aperture louver system.

Item 9, is the overall enclosure to the unit.

Item 10, and 10A are the primary air blower and disengagement clutch for the heater mode.

Item 11, is the shroud for air blower 10.

Figure 2:
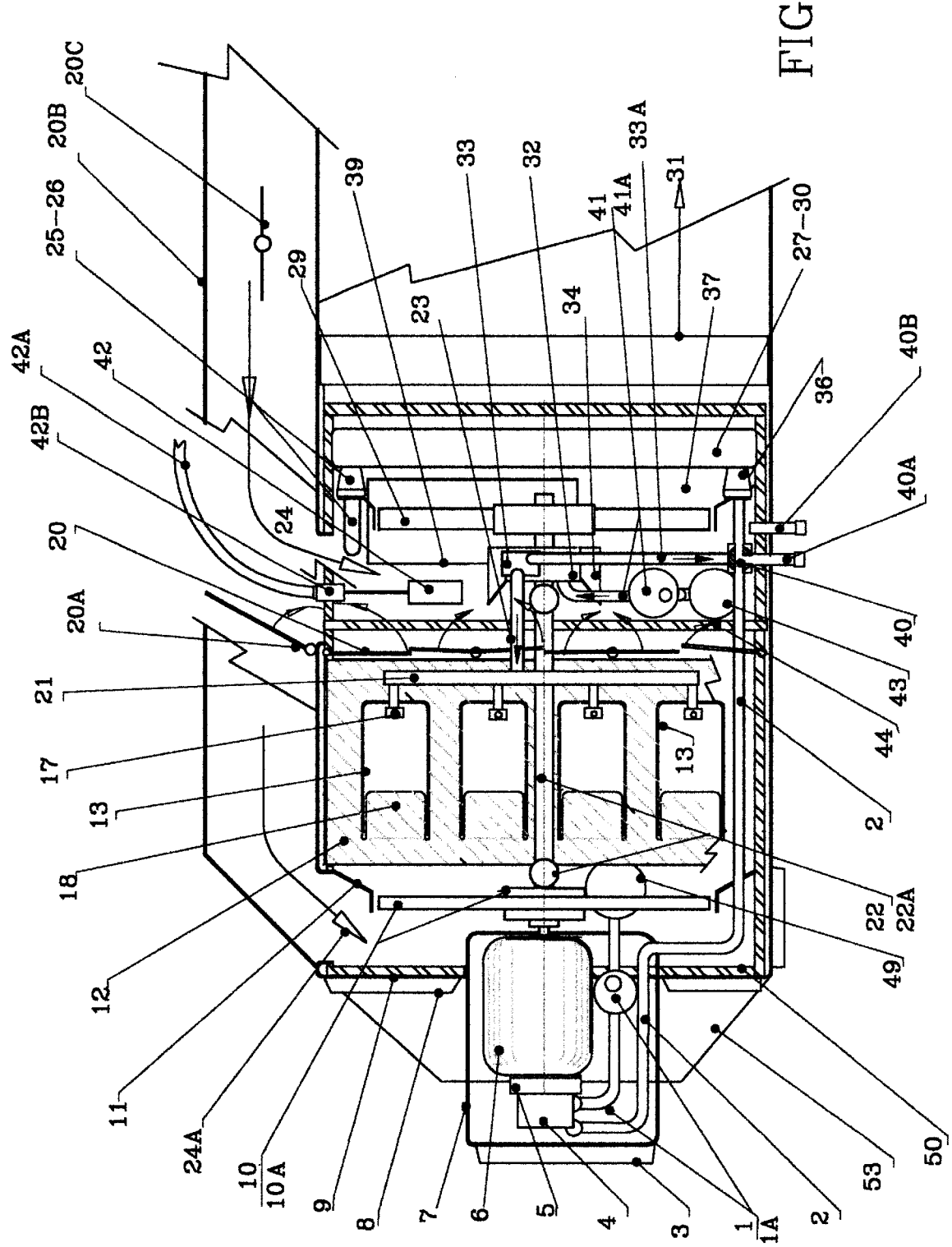
FIG. 2, is the plan view showing the internal components.

Item 12, are the thermally conductive channels' fins, of which the flaps 18, are an integral part, see FIG. 2.

Item 13, are the evaporation channels which, are longitudinally open on the portion of the side facing the air current between the upper fin 12 and the lower mounting ring 48, above fins 12 and below rings 48 these channels become complete tubes with both ends open. The lower end is below the water surface. The channels are attached to the base 53 by the rings 48.

Item 14, these are the air deflectors at the open top end of the channels 13. These deflectors serve also as condensing surfaces, reducing the moisture in the exhaust air and returning water to the system.

Item 15, these are the protruding surfaces where the water jets impact.

Item 16, these are the high pressure water jets that form a downward fine spray after impacting the protrusions 15.

Item 17, these are the high pressure injection nozzles.

Item 18, these are the extension flaps of the conductive fins 12. These flaps, while containing the spray into the channels are wet and by conductivity cool down the fins 12.

Item 19 is a representation of the water spray.

Item 20, are the internal deflectors for controlling air flow from the first to the second stage, they are shown in the closed position, Item 21, is the water manifold to the jet nozzles 17.

Item 22, is the drive shaft extension for the air blower.

Item 22A: are the universal joints at each end of the drive shaft extension.

Item 23 is the forward flow water line from pump 32 to the nozzles 17.

Item 24 and 24A are the connecting ports for the recirculated air in closed loop, The returning air conduit is show only in FIG. 2.

Item 25, is the warm water return line from the heat exchanger.

Item 26, is the connector between line 25 and manifold 27.

Item 27, is the output manifold of the heat exchanger 30.

Item 28, is the shroud of air blower 29.

Item 29, is the second stage air blower.

Item 30, is the core of the heat exchanger.

Item 31, shows the air filter and the direction of the air output.

Item 32, is the second or warm water pump to the injection nozzles.

Item 32A: is the elastic mounting pad for the second stage water pump and air blower Item 33 is the two way valve of pump 32, that when working as a heater shuts off the warm water to the injection nozzles, diverting said water via line 33A and valve 40 to heat exchanger 30.

Item 33 A, is the back flow water line when the system is working as a heater.

Item 34, is the pump and shaft bearing mounting bracket.

Item 35, is the heat exchanger intake manifold.

Item 36, is the connector to the cold water line 2.

Item 37, is the second or warm/hot water tray.

Item 38, shows the warm water operational level.

Item 39 is the heating element, active only when the system is used as a heater.

Figure 2A:
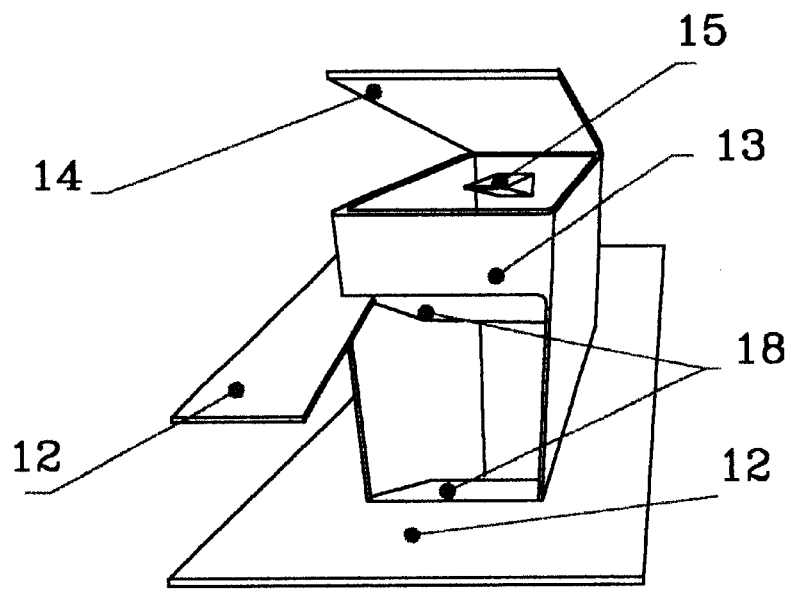
FIG. 2A, is a detail of the top end of the evaporation channels.
Figures 2B, 2C:
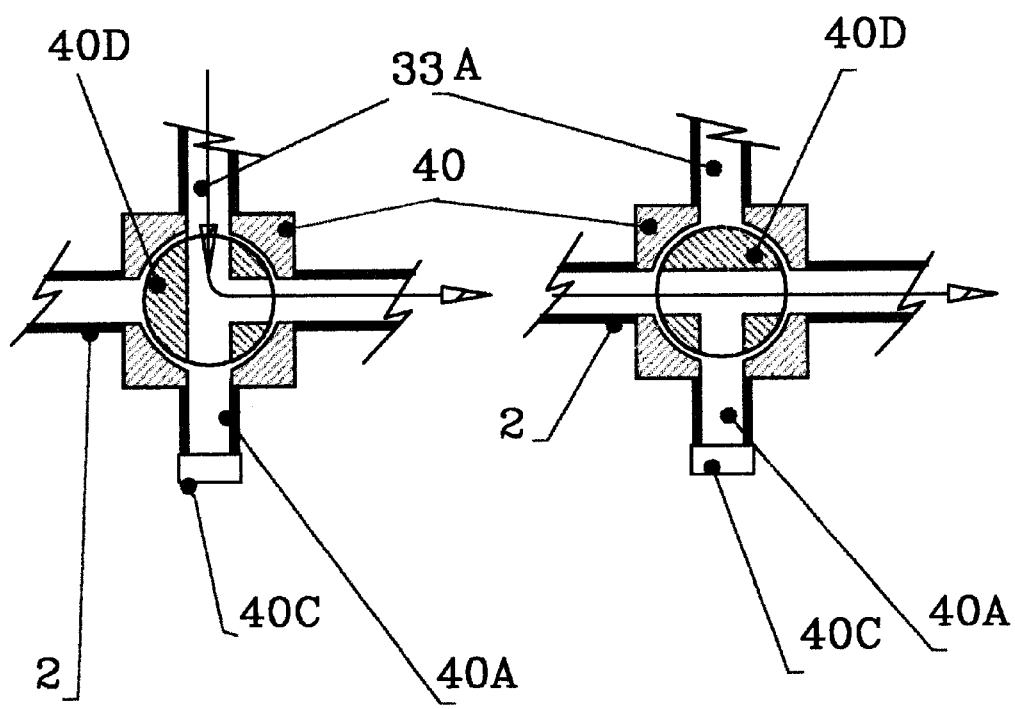
FIGS. 2B and 2C are details of the 3 way valve.

Item 40 is the 3 way valve, for changing from cooler to heater, see FIGS. 2B–2C.

Item 41 and 41A these are the warm water suction line and a siphon system, the like of item 1 and 1A, connecting with high pressure pump 32

Item 42, is the water level control float.

Item 43 is the warm/hot water filter.

Item 44 is the cold to warm/hot water divider between the two temperature trays.

Item 45 is the water level equalizer conduit.

Item 46, is the water level in the cold tray.

Item 47 is the tray's bottom.

Item 48 is the channel's mounting ring.

Item 49 is the cold water filter.

Item 50 is the cold water tray.

Item 51 is the drain plug.

Item 52 is a structural gusset.

Item 53 is the mounting base for the entire unit. It serves also as a cover for both trays.

Figure 1A:
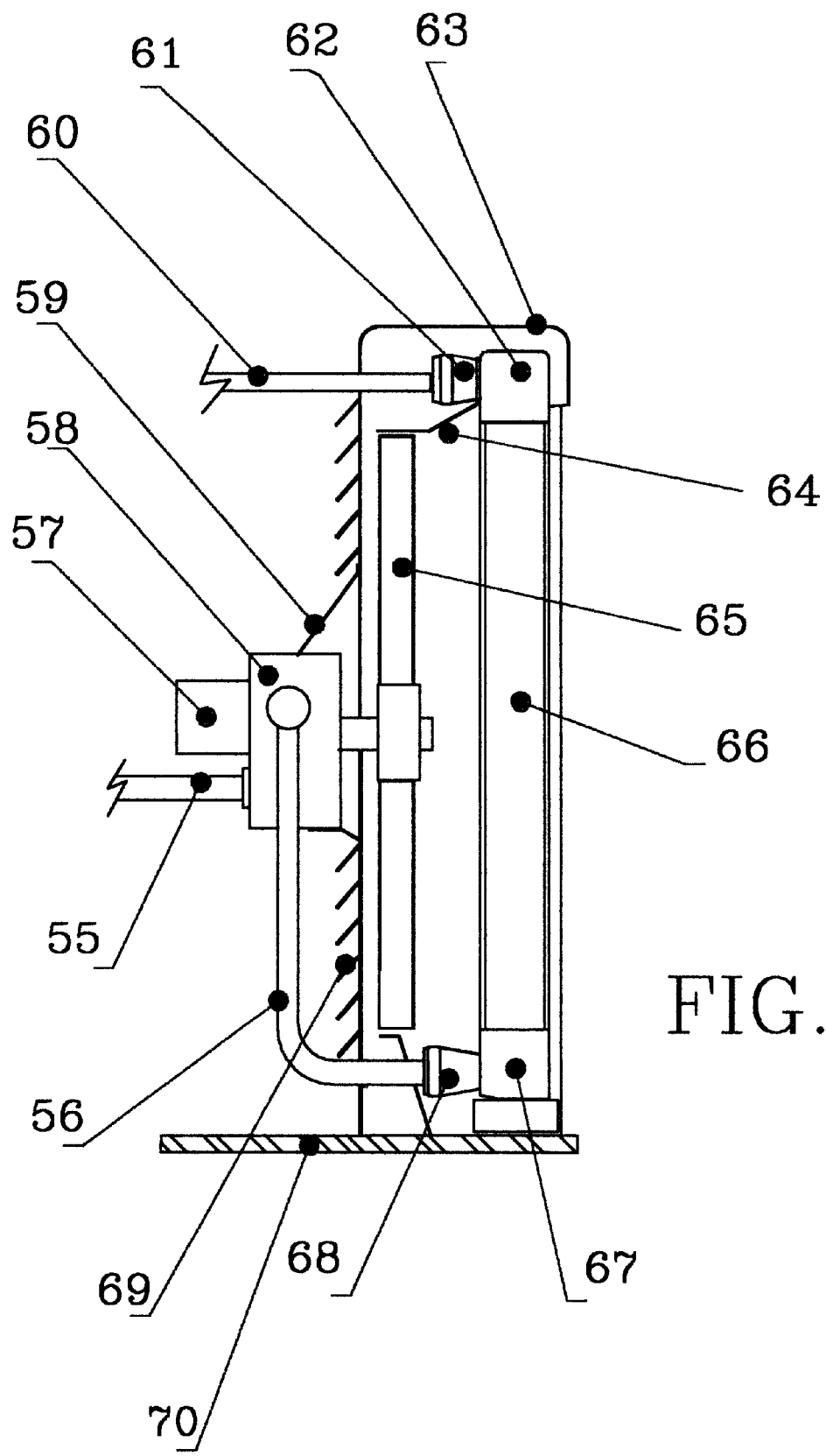
FIG. 1A is a longitudinal cross section of an optional remote second stage

Item 54 is the electric motor mounting bracket FIG. 1A:
This figure shows in cross section the optional remote second stage unit for a separate ambient. This unit is activated by connecting the input line 55 to line 40A of FIG. 2, while the output line 60 connects to the return line 40B of FIG. 2.

Item 55 is the water feed line.

Item 56 is the water line from the auxiliary pump 58 to the heat exchanger 66.

Item 57 is the electric motor for the auxiliary pump 58 and the air blower 65.

Item 58 is the auxiliary pump.

Item 59 is part of the mounting bracket for the pump and air blower.

Item 60 is the warm water return line to the main unit.

Item 61 is the connector to the heat exchanger's output manifold.

Item 62 is the output manifold.

Item 63,is the cover for the remote second stage.

Item 64 is the shroud of the air blower.

Item 65 is the air blower.

Item 66 is the core of the heat exchanger.

Item 67 is the heat exchanger's input manifold.

Item 68 is the connector to line 56 from pump 58.

Item 69 are the louvers for air admission to the unit.

Item 70 is the base of the remote unit. FIG. 2:
This is the plan view of the main unit. In order to show all the components the overall enclosure's top cover has been removed as well as parts of the mounting base 53. Also the air return conduit 20B is partially cut off to show the air deflector 21 and the water level control system. The depicted channels' fins 12 (cross hatched for clarity) are the ones below the level of the propulsion shaft 22.

The item numbers are in correspondence with those of FIG. 1

Item 1 and 1A these are the water pump suction line and the siphon system from the cold water tray 50 to pump 4.

Item 2 is the low pressure cold water line to the heat exchanger 30.

Item 3 are the ventilation louvers for cooling the electric motor 6.

Item 4 is the low pressure cold water pump to the heat exchanger 30.

Item 5 is the clutch which disconnects the pump 4 when the system operates as a heater.

Item 6 is the electric motor for the air blowers 10, 29 and pumps 4 and 32.

Item 7 is the enclosure of motor 6.

Item 8 is the variable aperture louver system.

Item 9 is the overall enclosure to the unit

Item 10 and 10A are the primary air blower and disengagement clutch for heater mode.

Item 11 is the shroud for 10.

Item 12 are the conductive fins (shown cross hatched).

Item 13, are the evaporation channels, the upper portion is shown in FIG. 2A.

Item 17 these are the high pressure injection nozzles.

Item 18 these are internal extension flaps of the conductive fins 12.

Item 20 are the internal deflectors, which control air flow between stages. They are shown in the closed position. For the open position, they have to be rotated 90 degrees, as shown by the arrows.

Item 20A is the adjustable deflector which controls the air flow from the return conduct 20B to the ports 24 and 24A to second and first stages.

Item 20B is the air return duct from the interior ambient.

Item 20C is the valve for opening or closing the return air duct.

Item 21 is the water manifold to the jet nozzles 17.

Item 22 is the drive shaft extension for the air blower and water pump of second stage.

Item 22A; are the universal joints at both ends of the shaft extension 22

Item 23 is the high pressure forward flow line to the water jets 17.

Item 24 and 24A are the connecting ports for the recirculated air in closed loop, air flow direction is indicated by the arrows.

Item 25 is the warm water return line from the heat exchanger 30.

Item 26 is the connector between line 25 and manifold 27.

Item 27 is the output manifold of heat exchanger 30.

Item 29 is the second stage air blower.

Item 30 is the core of the second stage heat exchanger.

Item 31 shows the air filter and the direction of the air output.

Item 32 is the high pressure warm water pump to the injection nozzles 17, when working as an air cooler.

Item 33 is the two way valve of pump 32 that, when working as a heater, shuts off the hot water to the evaporation channels diverting it via the back flow line 33A and valve 40 to heat exchanger 30.

Item 33 A is the back flow water line.

Item 34 is the pump mounting bracket.

Item 36 is the connector to line 2.

Item 37 is the warm/hot water tray.

Item 39 is the heating element, active only when the system is used as a heater.

Item 40 is the distribution valve, see FIGS. 2B and 2C.

Item 41 and 41A are the warm water suction line and siphon system, the like of 1 and 1A, for the high pressure pump 32

Item 42 is the water level control float.

Item 42A is the external water supply to replenish the evaporated water.

Item 42B, is the water level control valve.

Item 43 is the warm/hot water filter.

Item 44 is the cold to warm/hot water divider between both trays.

Item 49 is the, cold water filter.

Item 50 is the cold water tray.

Item 53 is part of the water trays cover and mounting base for the entire unit. FIG. 2A:

This figure is a three dimensional view of the top end of the evaporation channels.

Item 12 are the conductive fins, the uppermost one is partially cutoff to better show the bent down flaps 18.

Item 13 are the evaporation channels, showing how below the first fin the channel front side is open, while the top portion is closed on all 4 sides conforming a tube. The same configuration is used at the lower end below the mounting ring 48, where the tubular portion ends below the water free surface, see FIG. 1.

Item 14 are the channels' open end moist air deflectors, serving also as condensing surfaces returning water to the unit.

Item 15 are the surfaces upon which the water jets impact.

Item 18 are the bent down fins' flaps partially penetrating the channels. These flaps are cooled by the spray and prevent spilling outside the channels. FIG. 2B and 2C:

These figures are the detail of the distribution valve 40, which controls the water flow to the second stage, whether it will receive cold water from tray 50 or heated water from tray 37 when heater 39 is activated.

Item 2 is the cold water line.

Item 33 A is the back flow heated water line.

Item 40 is the body of the valve.

Item 40A is the connector to line 55 of the external second stage, see FIG. 1A.

Item 40C is the plug, used when there is no external unit.

Item 40D is the valve's rotor, in 2B is directing heated water to the second stages' heat exchangers, in 2C it directs cooled water to the heat exchanger.

FUNCTIONING OF THE INVENTION

Following the air circulation we have that the first stage which is comprised by a first air blower, a first or cold water pump, a plurality of evaporation finned channels, and the cold water tray located under the evaporation channels. The second stage is comprised by a second air blower, a second or warm water pump, a water to air heat exchanger and the second or warm/hot water tray where the return from the heat exchanger drains.

The two air blowers as well as the two water pumps are driven by a single electric motor 6, with double output shaft. The rear output drives the pump 4 through the clutch 5; the first air blower 10, is also driven through a clutch on the frontal output shaft of the said motor. The shaft extension 22 of said frontal output has universal joints coupling it to the motor drive shaft on one end and, to the driven shaft of the second pump 32 and air impeller 29 on the other end. The assembly of said pump and impeller is mounted on bracket 34 through the elastic pad 22B, said bracket 34 is attached to the cover of the second water tray.

The first stage's evaporation finned channels 13, are mounted on the top cover of the first water tray and have the open bottom end closed by the water in said tray, the top end is open to the atmosphere, said channels are located directly after the first blower 10, which takes the external air through the louvers 8 and into the unit. This air current is divided into two independent flows, one first fraction, flows into the channels, through the open front side, where the fins' portion that penetrates into the channels is bent downward, inducing an initial downward air flow that is reversed by the naturally negative pressure gradient toward the open top end, inducing a turbulent upward exhaust flow.

The second fractional air flow circulates in the space around the exterior of the channels, between the fins, from where it is directed by the second blower 29, toward the second stage's heat exchanger 30.

The cooling cycle starts at the first stage when water is injected upwardly by the nozzles 17, impinging in the solid protrusions 15 near the top end of the channels. The high velocity water impact produces a downward very fine spray in countercurrent to the air flow. This generates an energetic vaporization from the surface of the droplets. The moisture saturated air is exhausted at the open top end of the channels.

Since the thermal conductivity and heat capacity of water are far greater than that of the air, the heat of vaporization is subtracted mainly from the droplets surface, cooling down the droplets interior that does not vaporize. This cooled water drains down into the cool collection tray and reaches temperatures of about twenty degrees F below ambient, depending on the external air moisture. Part of the spray impacts on the fins' flaps preventing spillage to the outside and cooling the flaps and fins, which in turn pre-cools the air on its way to the second stage.

The water cooled by the spray's evaporation is accumulated in the cold water tray, from where it is pumped by the cold water pump trough a connecting line to the second stage heat exchanger, where it circulates into a plurality of finned tubes, subtracting heat from the air circulated by the second blower . The warmed water output from the heat exchanger drains back to the warm water tray, from here it is directed by the warm water pump and connecting lines to the jet nozzles in the vaporization channels where a new cycle is started.

The air, traversing the first stage through the inter-channel space is partially cooled by contact with the channels external fins, and then driven by the second blower to circulate through the heat exchanger's core, where it will cool down precipitating any excess of moisture. After this second stage, the air is directed to the air distribution system.

When operating as a closed loop system, air returned from the room through conduit 20B of FIG. 2, is admitted back into the unit at the suction side of each air blower, at ports 24 and 24A.

The deflector 20A, is shown in FIG. 2 for closed loop on the second stage, in this position the returned air circulates only through the second stage, while the first stage continues to cool the water using outside air, said deflector 20A at an intermediate position directs part of the air to the first stage through port 24A, and part to the second stage through port 24.

A high degree of internal air flow independence between the first and second stages is achieved by closing the deflectors 20 to the position shown in FIG. 2. By turning this deflectors 90 dg. as indicated by the arrows the two stages become totally interconnected. Intermediate air mixing ratios are obtained by partially closing said air deflectors.

When working in open loop configuration, the system takes only outside air through the louvers at the front end and the flap valve 20C is at the closed position (by rotating it by 90 dg.).

The main advantages of this invention for configuration A as an air cooler are: final lower air temperature, lower humidity content in the cooled air and smaller size of the entire unit with respect to other water evaporation coolers known of at this time.

This invention in operational mode B constitutes an air heater within the same embodiment of the air cooler of operational mode A. This transformation is achieved by disengaging the cold water pump and the first air blower and activating the water valves 33 and 40 and the heating element 39. Valve 33 which is normally open is changed to closed, shutting off the water supply to the nozzles 17. This action changes the water output of pump 32 to go to the heat exchanger 30 via line 33A and valve 40, in this valve 40 the rotor 40D is turned from the cooler position of FIG. 2C to the heater position shown in FIG. 2B. The heater element 39 raises the water temperature at a level thermostaticaly controlled.

The ratio of re-circulated air versus outside air, like in the cooling mode, is controlled by the air deflectors 20 and 20A.

In FIG. 2C the position of the rotor 40D shows how cold water from line 2 is divided into two flows, one that continues to heat exchanger 30 and other that through connector 40A will feed the heat exchanger 66 of FIG. 1A, when 40A is connected to line 55 of FIG. 1A, In FIG. 2B the position of rotor 40D shows how hot water from line 33A is divided into two flows, one that turns toward heat exchanger 30 and other, that through connector 40A, will feed the heat exchanger 66 of FIG. 1A when 40A is connected to line 55 of FIG. 1A, thereby changing the external heat exchanger from air cooler to air heater. This external unit has an auxiliary circulation pump 58 driven by the same motor than the air blower 65. The circuit is closed by connecting output line 60 of FIG. 1A to line 40B of FIG. 2.

Having described the physical components and functioning of a thermo-mechanical embodiment capable of two operational modes, A and B, a first one that function as a cooler and a second one that function as a heater, where variations in the previously described embodiment and configurations can be implemented without departing from the scope of the invention which is intended to be limited only by the scope of these claims.

What is claimed is:

1. An air cooler embodying an air cooler in operational mode A or an air heater in operational mode B, this invention, is characterized by having two stages, the first one is comprised by a first air blower placed in front of an array of vertical evaporation channels, said channels having water injection nozzles pointing upward toward protruding water impacting surfaces near the top end of the channels, said channels are mounted on the cover of a first or cold water collection tray, where the water from the channels drain, also it has a first water pump with intake lines from the said first water tray and output lines to the second stage, said second stage is comprised by an air to water heat exchanger, mounted on the cover of the second water collection tray where the said exchanger drains the circulating water, also a second air blower and a second water pump are located in front of the said heat exchanger, the said second pump has intake lines connected to said second water tray, and output lines connected to the water nozzles inside the said evaporation channels of the first stage, and through valves and proper lines back to the said heat exchanger of the second stage, also the said second tray has an internal on/off heating device thermostaticaly controlled.

2. The air cooler as claimed in claim 1 wherein said channels are open at both ends, as well as at the front side facing the air current induced by the said first air blower, and having these channels attached a plurality of horizontal external fins which partially extend into the channels trough the frontal opening, the channels' top end has air deflectors toward the open atmosphere, while the open bottom end is below the water level in the first water tray, the last portion of the channels near both ends the said channels become tubes.

3. The air cooler as claimed in claim 1 wherein the second stage pump has a two way valve which in cooler mode A, directs the pump output through the forward flow water line to the nozzles inside the first stage channels, and in heater mode B, will direct said output through the back flow line to a three way valve located where said back flow line meets with the cold water line from the first pump and with the line to the heat exchanger, said three way valve in the cooler mode A connects the output of the first pump line with the line to the heat exchanger and to an output external connector, simultaneously closing the connection with the back flow line from the second pump, in mode B said three way valve connects the output of the said back flow line with the intake line to the heat exchanger and to said external output connector, while closing the line from the first or cold water pump.

4. The air cooler as claimed in claim 1 wherein the external output connector from the three way valve in the second stage is connected by insulated water lines to a remote auxiliary second stage, comprised by an air to water heat exchanger, an auxiliary circulation water pump, an air blower, a driving electric motor and a structural cover with a stable base, the said heat exchanger has a return water line connected to the warm water tray in the main unit.

5. The air cooler as claimed in claim 1 wherein the entire unit has an overall enclosure that directs the air output of the blowers through the two stages and to the interior ambient, also the said enclosure has a return air duct that connects the internal ambient with the suction side of each air blower through the two lateral openings of said enclosure, the said return duct has two adjustable air deflectors one between the two lateral openings and the other upstream of said openings, internally the overall enclosure has, directly after the evaporation channels, a set of air deflectors, said deflectors can be positioned at different angles respect to the internal air stream direction, ranging from parallel to perpendicular to the general direction of the air flow, said deflectors span the full internal high and width of the unit.

6. The air cooler as claimed in claim 1 wherein the first or cold water pump, the first air blower, the second or warm water pump and the second air blower are mounted coaxialy and are driven by a single electric motor through a proper shaft extension, the said first water pump and first air blower are connected to said shaft by an on/off controllable engaging mechanism, while the said second air blower and second water pump are permanently engaged on the said driving shaft extension.

7. The air cooler as claimed in claim 1 wherein the shaft extension from the drive motor to the second stage shaft for the water pump and air blower is coupled at each of those ends by universal joints, being said second stage shaft guided by a bearing and housing attached to a supporting bracket through an elastic pad.

8. The air cooler as claimed in claim 1 wherein the second stage heat exchanger is comprised by an intake manifold with a connector for the water line coming from the three way valve and an output manifold with a connector for a drain line to the warm water tray, wherein these two manifolds are interconnected by an array of finned tubes uniformly spaced, said tubes conforming the core of the heat exchanger.

9. The air cooler as claimed in claim 1 wherein the water lines to the cold water pump as well as the water lines to the warm water pump incorporates each one a siphon system of the proper height to prevent water back flow during stoppage periods.

* * * * *